(12) United States Patent
Kobayashi et al.

(10) Patent No.: US 11,249,303 B2
(45) Date of Patent: Feb. 15, 2022

(54) ROTARY POLYGON MIRROR, LIGHT DEFLECTING UNIT, AND OPTICAL SCANNING APPARATUS INCLUDING LIGHT DEFLECTING UNIT

(71) Applicant: CANON KABUSHIKI KAISHA, Tokyo (JP)

(72) Inventors: Hisanori Kobayashi, Kawasaki (JP); Yoshihiko Tanaka, Mishima (JP); Naoki Matsushita, Suntou-gun (JP); Takatoshi Tanaka, Atami (JP); Mitsuhiro Ohta, Yokohama (JP); Hiroki Katayama, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/939,764

(22) Filed: Jul. 27, 2020

(65) Prior Publication Data
US 2021/0033851 A1    Feb. 4, 2021

(30) Foreign Application Priority Data
Jul. 30, 2019 (JP) .............................. JP2019-140193

(51) Int. Cl.
*G02B 26/12* (2006.01)
*G03G 15/04* (2006.01)

(52) U.S. Cl.
CPC ....... *G02B 26/12* (2013.01); *G03G 15/04072* (2013.01)

(58) Field of Classification Search
CPC .............. G03G 15/04072; G02B 26/12; G02B 26/124; G02B 26/125
See application file for complete search history.

(56) References Cited

U.S. PATENT DOCUMENTS 5,574,591 A * 11/1996 Suzuki .................. F16C 17/026
359/200.1
6,449,000 B1 * 9/2002 Suzuki ................. G02B 26/121
347/260

FOREIGN PATENT DOCUMENTS

| JP | S63-026806 Y2 | 7/1988 |
| JP | H09-080346 A | 3/1997 |
| JP | 2001-228432 A | 8/2001 |
| JP | 2002-048996 A | 2/2002 |

* cited by examiner

*Primary Examiner* — Hoang X Ngo
(74) *Attorney, Agent, or Firm* — Canon U.S.A., Inc., IP Division

(57) ABSTRACT

A rotary polygon mirror has no recess in a thickness region of one of the reflecting surfaces of the rotary polygon mirror in the direction of the rotation axis of the rotary polygon mirror and has a protruding portion protruding from the thickness region in a direction away from the thickness region.

14 Claims, 4 Drawing Sheets

ROTARY POLYGON MIRROR, LIGHT DEFLECTING UNIT, AND OPTICAL SCANNING APPARATUS INCLUDING LIGHT DEFLECTING UNIT

BACKGROUND OF THE INVENTION

Field of the Invention

The present disclosure relates to a rotary polygon mirror for deflecting laser light, a light deflecting unit including the rotary polygon mirror, and an optical scanning apparatus including the light deflecting unit.

Description of the Related Art

Laser printers and copying machines that form toner images on recording media using an electrophotographic recording technique are equipped with an optical scanning apparatus that scans a photo conductor with laser light according to image information. The optical scanning apparatus includes a light deflecting unit that deflects laser light emitted from a light source. The light deflecting unit includes a rotary polygon mirror that reflects the laser light.

As described in Japanese Patent Laid-Open No. 9-80346, the rotary polygon mirror has an ultraviolet curable adhesive or the like applied as a weight for balance correction to reduce or eliminate vibration during high-speed rotation of the rotary polygon mirror. This adhesive allows the unbalance of the rotary polygon mirror to be finely adjusted and the rotary polygon mirror to rotate smoothly. In Japanese Patent Laid-Open No. 9-80346, the adhesive is applied to a groove of the rotary polygon mirror concentric with the rotation axis of the rotary polygon mirror.

Japanese Patent Laid-Open No. 9-80346 discloses a configuration for preventing a decrease in the flatness of the reflecting surface due to a stress generated when the adhesive hardens. However, in particular, if the material of the rotary polygon mirror is resin, the reflecting surface is more likely to be influenced by the stress during the hardening of the adhesive, and therefore further improvement is required.

SUMMARY OF THE INVENTION

The present disclosure is made in view of the above disadvantage. Accordingly, the present disclosure provides a rotary polygon mirror in which the decrease in the flatness of the reflecting surface is reduced or eliminated, a light deflecting unit, and an optical scanning apparatus including the light deflecting unit.

According to an aspect of the present disclosure, a rotary polygon mirror made of resin for a light deflecting unit that deflects laser light is provided. The rotary polygon mirror includes a plurality of reflecting surfaces configured to reflect the laser light, and when the rotary polygon mirror is viewed in a direction perpendicular to a direction of a rotation axis of the rotary polygon mirror, the rotary polygon mirror has no recess in a thickness region of one of the reflecting surfaces of the rotary polygon mirror in the direction of the rotation axis of the rotary polygon mirror and has a protruding portion protruding from the thickness region in a direction away from the thickness region.

According to another aspect of the present disclosure, a light deflecting unit that deflects laser light is provided. The light deflecting unit includes a rotary polygon mirror made of resin having a plurality of reflecting surfaces that reflect laser light, and a motor that rotates the rotary polygon mirror. When the rotary polygon mirror is viewed in a direction perpendicular to a direction of a rotation axis of the rotary polygon mirror, the rotary polygon mirror has no recess in a thickness region of one of the reflecting surfaces of the rotary polygon mirror in the direction of the rotation axis of the rotary polygon mirror and has a protruding portion protruding from the thickness region in a direction away from the thickness region, and a weight for balance correction is applied to a portion of the protruding portion adjacent to a rotation center of the rotary polygon mirror.

According to yet another aspect of the present disclosure, an optical scanning apparatus that scans a scanned surface with laser light is provided. The optical scanning apparatus includes a light source that emits laser light, and a light deflecting unit that deflects the laser light. The light deflecting unit includes a rotary polygon mirror made of resin having a plurality of reflecting surfaces that reflect the laser light, and a motor that rotates the rotary polygon mirror. When the rotary polygon mirror is viewed in a direction perpendicular to a direction of a rotation axis of the rotary polygon mirror, the rotary polygon mirror has no recess in a thickness region of one of the reflecting surfaces of the rotary polygon mirror in the direction of the rotation axis of the rotary polygon mirror and has a protruding portion protruding from the thickness region in a direction away from the thickness region. A weight for balance correction is applied to a portion of the protruding portion adjacent to a rotation center of the rotary polygon mirror.

Further features of the present disclosure will become apparent from the following description of exemplary embodiments with reference to the attached drawings.

DESCRIPTION OF THE EMBODIMENTS

First Embodiment

Figure 1:
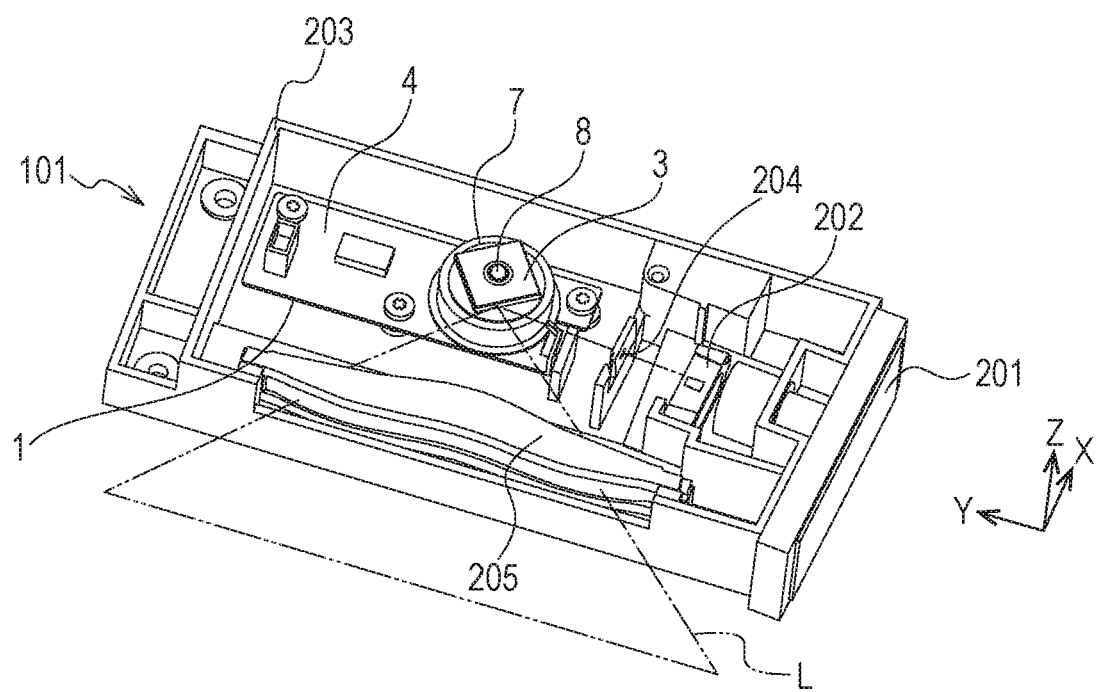
FIG. 1 is a perspective view of an optical scanning apparatus according to a first embodiment.

Referring to FIG. 1, an optical scanning apparatus 101 will be described. The optical scanning apparatus 101 is an apparatus that scans a photo conductor provided in an electrophotographic printer or copying machine with laser light according to image information. The optical scanning apparatus 101 is installed in a printer or a copying machine. FIG. 1 is a perspective view of the optical scanning apparatus 101 illustrating the configuration in a state in which a cover (not illustrated) for covering the interior of the casing 203 is removed.

Laser light L emitted from a light source unit 201 is focused in a sub-scanning direction by a cylindrical lens 202 and is limited to a predetermined beam diameter by an optical diaphragm 204 formed in part of the casing 203. The laser light L that has passed through the optical diaphragm 204 is deflected by a rotary polygon mirror 3 of the light deflecting unit 1. The laser light L thereafter passes through an fθ lens 205 and scans a photo conductor (a scanned surface, not illustrated). The cylindrical lens 202, the light deflecting unit 1, and the fθ lens 205 are housed in the casing 203. The light source unit 201 is mounted to the side wall of the casing 203 from the outside of the casing 203. The direction of the laser light L deflected by the rotary polygon mirror 3 is defined as follows: the Y-axis direction is defined as a main scanning direction, and the Z-axis direction is defined as a sub-scanning direction.

Figure 2:
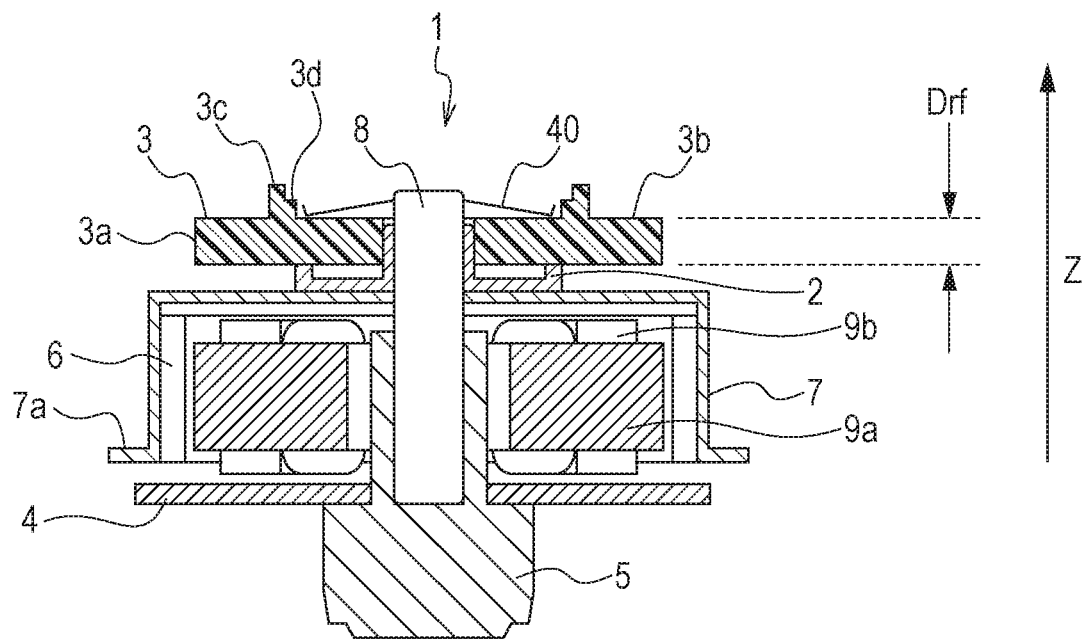
FIG. 2 is a cross-sectional view of a light deflecting unit of the first embodiment.

Referring next to FIG. 2, the light deflecting unit 1 will be described. The light deflecting unit 1 includes the rotary polygon mirror 3 having a plurality of reflecting surfaces that reflect the laser light L and a motor for rotating the rotary polygon mirror 3. FIG. 2 is a cross-sectional view of the light deflecting unit 1. The light deflecting unit 1 includes the rotary polygon mirror 3. The rotary polygon mirror 3 has a reflecting surface 3a that reflects the laser light L. The material of the rotary polygon mirror 3 is resin. The light deflecting unit 1 includes a motor substrate 4 made of sheet metal, a bearing sleeve 5 supported by the motor substrate 4, a stator core 9a fixed to the motor substrate 4, and a stator coil 9b fixed to the stator core 9a, in addition to the rotary polygon mirror 3. The light deflecting unit 1 further includes a rotor 7 including a rotor magnet 6, a rotation shaft 8 integrated with the rotor 7, and a seat 2 that supports the rotary polygon mirror 3. When the stator core 9a is excited by a driving current supplied from a drive circuit provided on the motor substrate 4, the rotor 7 loaded with the rotary polygon mirror 3 rotates at high speed. The laser light L is deflected by the reflecting surface 3a of the rotary polygon mirror 3 rotating at high speed.

Figure 4A:
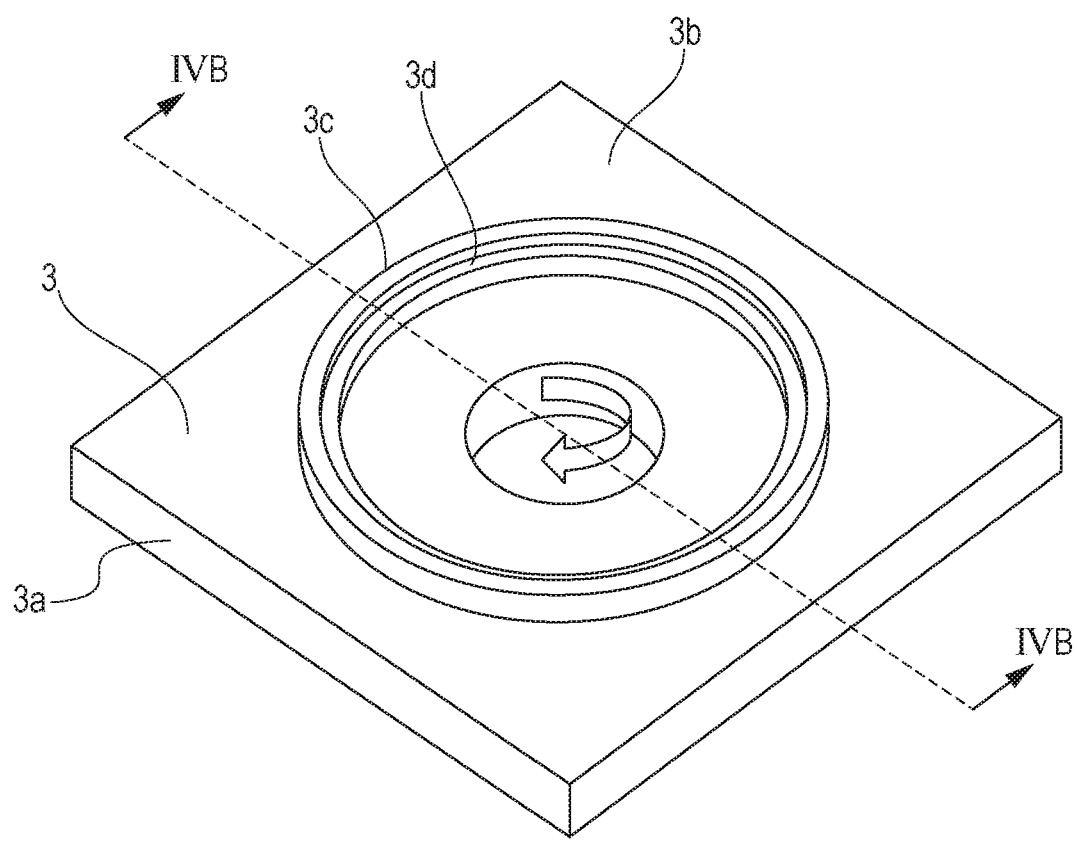
FIG. 4A is a perspective view of a rotary polygon mirror of the first embodiment.
Figure 4B:
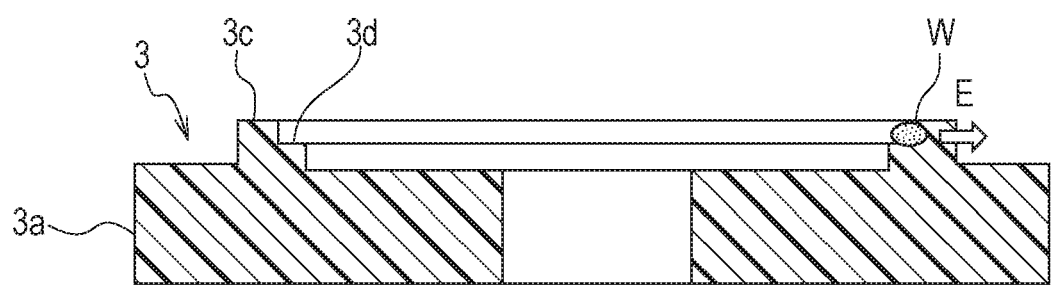
FIG. 4B is a cross-sectional view of the rotary polygon mirror of the first embodiment.

FIG. 4A is a perspective view of the rotary polygon mirror 3, and FIG. 4B is an IVB-IVB cross-sectional view of the rotary polygon mirror 3. A top surface 3b perpendicular to the reflecting surface 3a of the rotary polygon mirror 3 is provided with a ring-shaped protruding portion (first protruding portion) 3c that is concentric (coaxial) with the rotation shaft 8. A portion of the protruding portion 3c adjacent to the rotation shaft 8 has a step portion (a second protruding portion) 3d with a shape in which part of the protruding portion 3c is cut out. In other words, the rotary polygon mirror 3 has the second protruding portion with a protrusion amount smaller than that of the first protruding portion on the side nearer to the rotation center than the first protruding portion.

Figure 3:
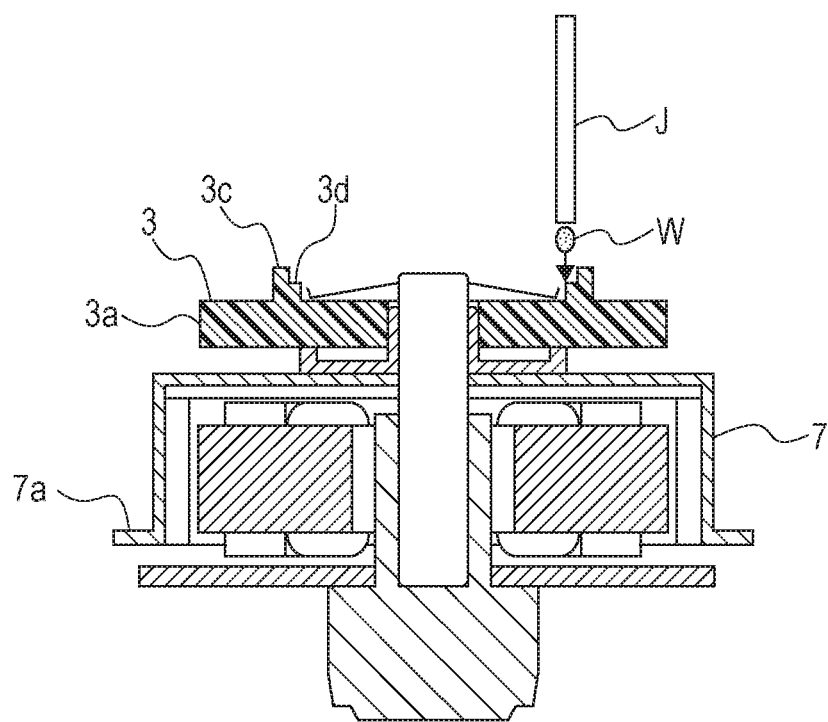
FIG. 3 is a diagram illustrating an operation for applying a weight for balance correction.

Next, the balance correction of the rotary polygon mirror 3 will be described. FIG. 3 is a diagram illustrating part of processing for correcting the balance of the rotary polygon mirror 3. The first step of the balance correcting operation is measuring vibration due to the unbalance of the rotary polygon mirror 3 to calculate the degree of the unbalance of the rotary polygon mirror 3. Next, as illustrated in FIG. 3, a balance weight (a weight) W composed mainly of an adhesive is applied to the step portion 3d of the rotary polygon mirror 3, as indicated by the arrow. In other words, the balance weight W is applied to a portion of the protruding portion 3c adjacent to the rotation center of the rotary polygon mirror 3. The balance weight W may be applied across the protruding portion 3c and the step portion 3d.

The mass of the balance weight W is controlled using an application jig J. The balance weight W is applied to a desired position where the unbalance of the rotating rotary polygon mirror 3 is cancelled. After the application, the balance weight W is hardened by application of ultraviolet rays or another technique to be bonded to the rotary polygon mirror 3.

In the bonding processing, an inner stress caused by the cure shrinkage of the adhesive and cure reaction heat of the adhesive are generated. These stress and heat may deform the reflecting surface 3a to decrease the flatness. This has a great influence particularly on the rotary polygon mirror 3 made of resin.

However, in this embodiment, the step portion 3d which is a position where the balance weight W is applied (the surface to be coated with the balance weight W) is provided at a region of the rotary polygon mirror 3 separated from the region of the thickness, Drf, (FIG. 2) of the reflecting surface 3a in the Z-axis direction. This makes the stress during the hardening of the adhesive less prone to influence the reflecting surface 3a, reducing or eliminating the deformation of the reflecting surface 3a. Furthermore, since the protruding portion 3c and the step portion 3d are disposed in a distant position from the thickness region Drf, there is a high heat radiation effect. This makes the reflecting surface 3a less susceptible to the heat of curing reaction, thereby preventing deformation of the reflecting surface 3a due to heat. In particular, in this embodiment, the step portion 3d is more away from the region Drf in the Z-axis direction than the top surface 3b. This enhances the effect of suppressing the deformation of the reflecting surface 3a.

When the rotary polygon mirror 3 rotates about the rotation axis as indicated by the arrow in FIG. 4A, a centrifugal force E acts on the balance weight W, as illustrated in FIG. 4B. At that time, the adhesive receives a shearing stress, so that the bonding strength of the adhesive can be decreased. Since the rotary polygon mirror 3 molded using a mold is taken out of the mold, it has good releasability and has a low surface friction coefficient. For that reason, sufficient adhesiveness of the balance weight W may not be ensured. However, in this embodiment, the protruding portion 3c plays the role of a standing wall, and an adhesive is applied to the L-shaped surface formed of the protruding portion 3c and the step portion 3d. This increases the adhesion area, providing desired adhesive strength.

In particular, for a high-speed rotating light deflecting unit, applying a balance correction adhesive at separate positions in the rotation axis direction provides a high balance correction effect. In this embodiment, a first balance correction adhesive is applied to a bent portion 7a of the rotor 7, and a second balance correction adhesive is applied to the step portion 3d. This allows the distance between the first and second positions where the adhesive is applied to be longer than the distance when the second balance correction adhesive is applied in the thickness region Drf in the rotation axis direction, increasing the balance correction effect.

Thus, the rotary polygon mirror 3 of this embodiment has no recess in the thickness region Drf of the reflecting surface 3a of the rotary polygon mirror 3 in the rotation axis direction of the rotary polygon mirror 3 but has the protruding portion 3c protruding from the thickness region Drf in the direction away from the thickness region Drf, as well as the step portion 3d. This allows providing a highly reliable light deflecting unit while suppressing deformation of the reflecting surface 3a of the rotary polygon mirror 3 and achieving high adhesive strength of the balance weight W.

Furthermore, the thickness region Drf has therein no complicated ununiform portion. This provides sufficient fluidity of the resin to the reflecting surface 3a and releasability during molding are provided, increasing the surface accuracy of the reflecting surface 3a.

Second Embodiment

Figure 5:
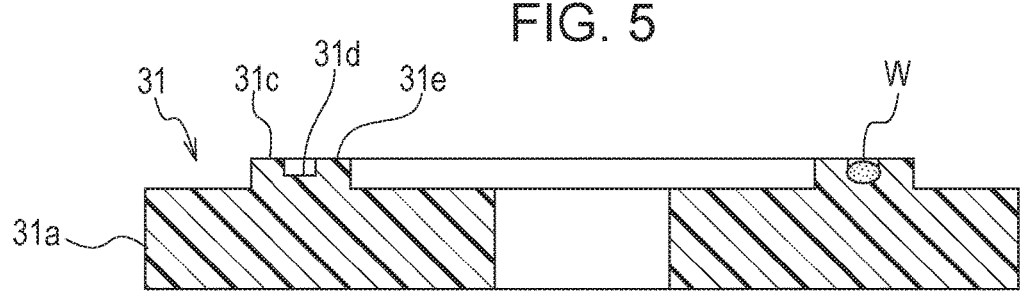
FIG. 5 is a cross-sectional view of a rotary polygon mirror of a second embodiment.

FIG. 5 is a cross-sectional view of a rotary polygon mirror 31 of a second embodiment. The rotary polygon mirror 31 further includes a third protruding portion 31e that protrudes more than the step portion 3d nearer to the rotation center than the step portion 31d, in addition to a protruding portion (first protruding portion) 31c and a step portion (second protruding portion) 31d. The balance weight W is applied to the step portion 31d. The protruding portion 31c, the step portion 31d, and the third protruding portion 31e also have a ring shape concentric with the rotation axis.

The rotary polygon mirror 31 of this embodiment has a configuration in which the adhesive hardly sticks out toward the top surface 31b and a rotation shaft direction while exhibiting the same effect as that of the first embodiment. This reduces or eliminates wind noise due to the rotation of the rotary polygon mirror 31 without significantly increasing the air resistance of the adhesive during high-speed rotation.

Furthermore, the recessed shape of the portion where the adhesive is applied increases the adhesion area, allowing firm adhesion. This is more advantageous also when the centrifugal force is increased because of the high-speed rotation.

Third Embodiment

Figure 6:
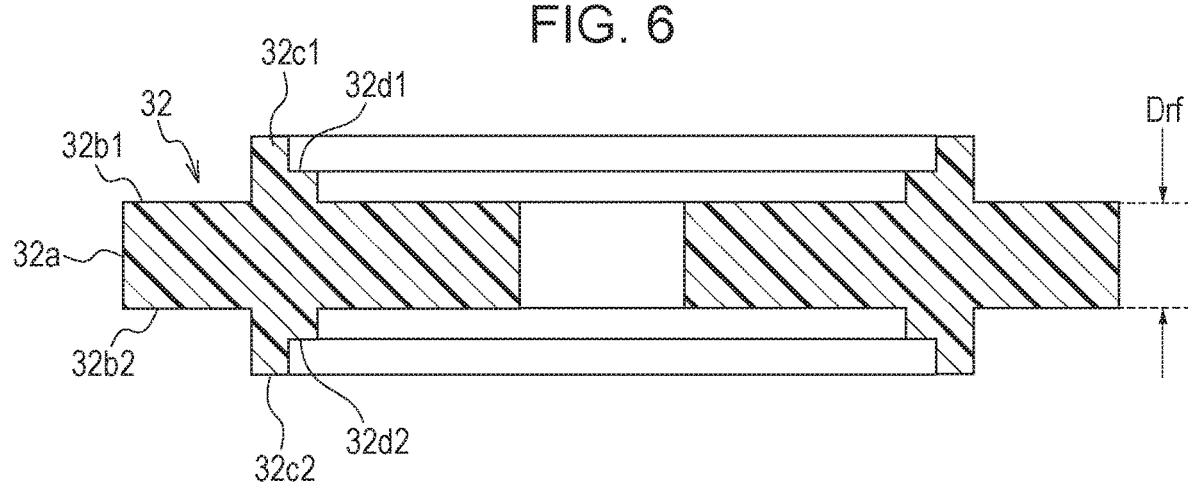
FIG. 6 is a cross-sectional view of a rotary polygon mirror of a third embodiment.

FIG. 6 is a cross-sectional view of a rotary polygon mirror 32 of a third embodiment. The resin rotary polygon mirror 32 includes a protruding portion (first protruding portion) 32c1 and a step portion 32d1, to which an adhesive for balance correcting is applied, on the top surface 32b1 of the rotary polygon mirror 32. The rotary polygon mirror 32 further includes a protruding portion 32c2 and a step portion 32d2, which are symmetric to the protruding portion 32c1 and the step portion 32d1, on a lower surface 32b2 on the opposite side of a reflecting surface 32a from the top surface 32b1 in the direction of the rotation axis. Thus, the first protruding portion and the second protruding portion of the rotary polygon mirror 32 are provided on opposite surfaces of the rotary polygon mirror 32. The protruding portions 32c1 and 32c2 and the step portions 32d1 and 32d2 also have a ring shape concentric with the rotation shaft 8.

The protruding portions 32c1 and 32c2 and the step portions 32d1 and 32d2 of the rotary polygon mirror 32 are disposed at positions away from the region Drf of the reflecting surface 32a in the direction of the rotation axis and are symmetric about the reflecting surface 32a. In other words, the region Drf of the rotary polygon mirror 32 is constant in thickness in the radial direction about the rotation axis and is vertically symmetric in cross sectional. This makes it easy to stabilize the fluidity of the liquid resin in molding the resin rotary polygon mirror 32 in a mold, making it less likely to generate distortion of the reflecting surface 32a due to uneven internal stress etc.

The symmetrical shape about the reflecting surface 32a makes the centrifugal force generated during the rotation of the rotary polygon mirror 32 and the resulting stress applied to the protruding portions vertically symmetric, further reducing or eliminating the deformation of the reflecting surface 32a.

Fourth Embodiment

Figure 7:
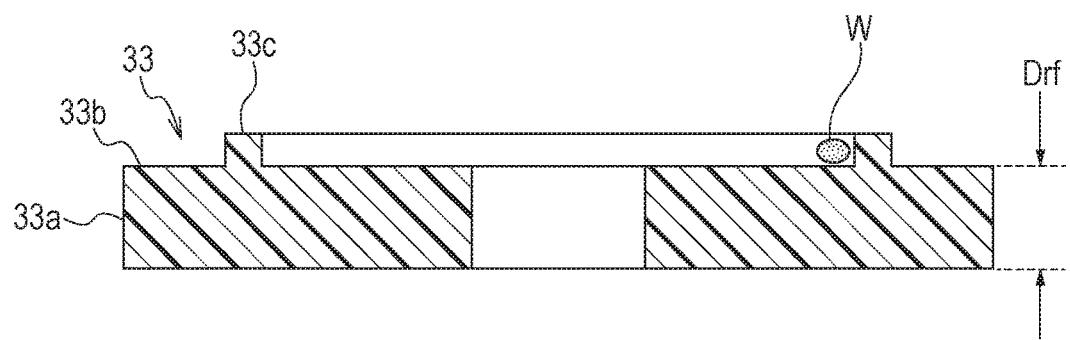
FIG. 7 is a cross-sectional view of a rotary polygon mirror of a fourth embodiment.

FIG. 7 is a cross-sectional view of a rotary polygon mirror 33 of a fourth embodiment. The rotary polygon mirror 33 of this embodiment includes a protruding portion 33c but does not include the step portion as in the first embodiment. Therefore, the balance weight W is in direct-direct contact with a top surface 33b. In this embodiment, since the balance weight W is in contact with the top surface 33b, the effect of preventing the deformation of the reflecting surface 33a due to heat is smaller than those of the first to third embodiments. However, this embodiment also prevents a decrease in the flatness of the reflecting surface 33a because the region Drf has no recess, and even if a centrifugal force acts on the balance weight W, the centrifugal force is received by the protruding portion 33c, preventing a decrease the adhesive strength of the balance weight W.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140193, filed on Jul. 30, 2019, which is hereby incorporated by reference herein in its entirety.

What is claimed is:
1. A rotary polygon mirror made of resin for a light deflecting unit that deflects laser light, the rotary polygon mirror comprising:
a plurality of reflecting surfaces configured to reflect the laser light,
wherein, when the rotary polygon mirror is viewed in a direction perpendicular to a direction of a rotation axis of the rotary polygon mirror, the rotary polygon mirror has no recess in a thickness region of the rotary polygon mirror in the direction of the rotation axis of the rotary polygon mirror and has a protruding portion protruding from the thickness region in a direction away from the thickness region, and wherein the thickness region is a region between one end of the plurality of reflecting surfaces in the direction of the rotation axis of the rotary polygon mirror and another end of the plurality of reflecting surfaces in the direction of the rotation axis of the rotary polygon mirror.

2. The rotary polygon mirror according to claim 1,
wherein the protruding portion has a ring shape coaxial with a rotation center of the rotary polygon mirror.

3. The rotary polygon mirror according to claim 1,
wherein the protruding portion is a first protruding portion, and wherein the rotary polygon mirror further includes a second protruding portion having a protrusion amount smaller than the protrusion amount of the first protruding portion nearer to a rotation center than the first protruding portion.

4. The rotary polygon mirror according to claim 3,
wherein the rotary polygon mirror further includes a third protruding portion having a protrusion amount larger than the protrusion amount of the second protruding portion nearer to the rotation center than the second protruding portion.

5. The rotary polygon mirror according to claim 3,
wherein both of the first protruding portion and the second protruding portion are disposed on opposite surfaces of the rotary polygon mirror.

6. A light deflecting unit that deflects laser light, comprising:
a rotary polygon mirror made of resin having a plurality of reflecting surfaces that reflect laser light; and
a motor that rotates the rotary polygon mirror,
wherein, when the rotary polygon mirror is viewed in a direction perpendicular to a direction of a rotation axis of the rotary polygon mirror, the rotary polygon mirror has no recess in a thickness region of the rotary polygon mirror in the direction of the rotation axis of the rotary polygon mirror and has a protruding portion protruding from the thickness region in a direction away from the thickness region,
wherein the thickness region is a region between one end of the plurality of reflecting surfaces in the direction of the rotation axis of the rotary polygon mirror and another end of the plurality of reflecting surfaces in the direction of the rotation axis of the rotary polygon mirror, and
wherein a weight for balance correction is applied to a portion of the protruding portion adjacent to a rotation center of the rotary polygon mirror.

7. The light deflecting unit according to claim 6,
wherein the protruding portion has a ring shape coaxial with the rotation center of the rotary polygon mirror.

8. The light deflecting unit according to claim 6,
wherein the protruding portion is a first protruding portion, and wherein the rotary polygon mirror further includes a second protruding portion having a protrusion amount smaller than the protrusion amount of the first protruding portion nearer to the rotation center than the first protruding portion.

9. The light deflecting unit according to claim 8,
wherein the weight is applied across the first protruding portion and the second protruding portion.

10. The light deflecting unit according to claim 8,
wherein the rotary polygon mirror further includes a third protruding portion having a protrusion amount larger than the protrusion amount of the second protruding portion nearer to the rotation center than the second protruding portion.

11. The light deflecting unit according to claim 8,
wherein both of the first protruding portion and the second protruding portion are disposed on opposite surfaces of the rotary polygon mirror.

12. An optical scanning apparatus that scans a scanned surface with laser light, comprising:
a light source that emits laser light; and
a light deflecting unit that deflects the laser light,
wherein the light deflecting unit includes:
a rotary polygon mirror made of resin having a plurality of reflecting surfaces that reflect the laser light; and
a motor that rotates the rotary polygon mirror,
wherein, when the rotary polygon mirror is viewed in a direction perpendicular to a direction of a rotation axis of the rotary polygon mirror, the rotary polygon mirror has no recess in a thickness region of the rotary polygon mirror in the direction of the rotation axis of the rotary polygon mirror and has a protruding portion protruding from the thickness region in a direction away from the thickness region,
wherein the thickness region is a region between one end of the plurality of reflecting surfaces in the direction of the rotation axis of the rotary polygon mirror and another end of the plurality of reflecting surfaces in the direction of the rotation axis of the rotary polygon mirror, and
wherein a weight for balance correction is applied to a portion of the protruding portion adjacent to a rotation center of the rotary polygon mirror.

13. A rotary polygon mirror made of resin for a light deflecting unit that deflects laser light, the rotary polygon mirror comprising:
a plurality of reflecting surfaces configured to reflect the laser light,
wherein, when the rotary polygon mirror is viewed in a direction perpendicular to a direction of a rotation axis of the rotary polygon mirror, the rotary polygon mirror has no recess in a thickness region of one of the reflecting surfaces of the rotary polygon mirror in the direction of the rotation axis of the rotary polygon mirror and has a first protruding portion protruding from the thickness region in a direction away from the thickness region, and
wherein the rotary polygon mirror further includes a second protruding portion having a protrusion amount smaller than the protrusion amount of the first protruding portion nearer to a rotation center than the first protruding portion.

14. The rotary polygon mirror according to claim 13,
wherein the first and second protruding portions have a ring shape coaxial with a rotation center of the rotary polygon mirror.

* * * * *